Figure 3:
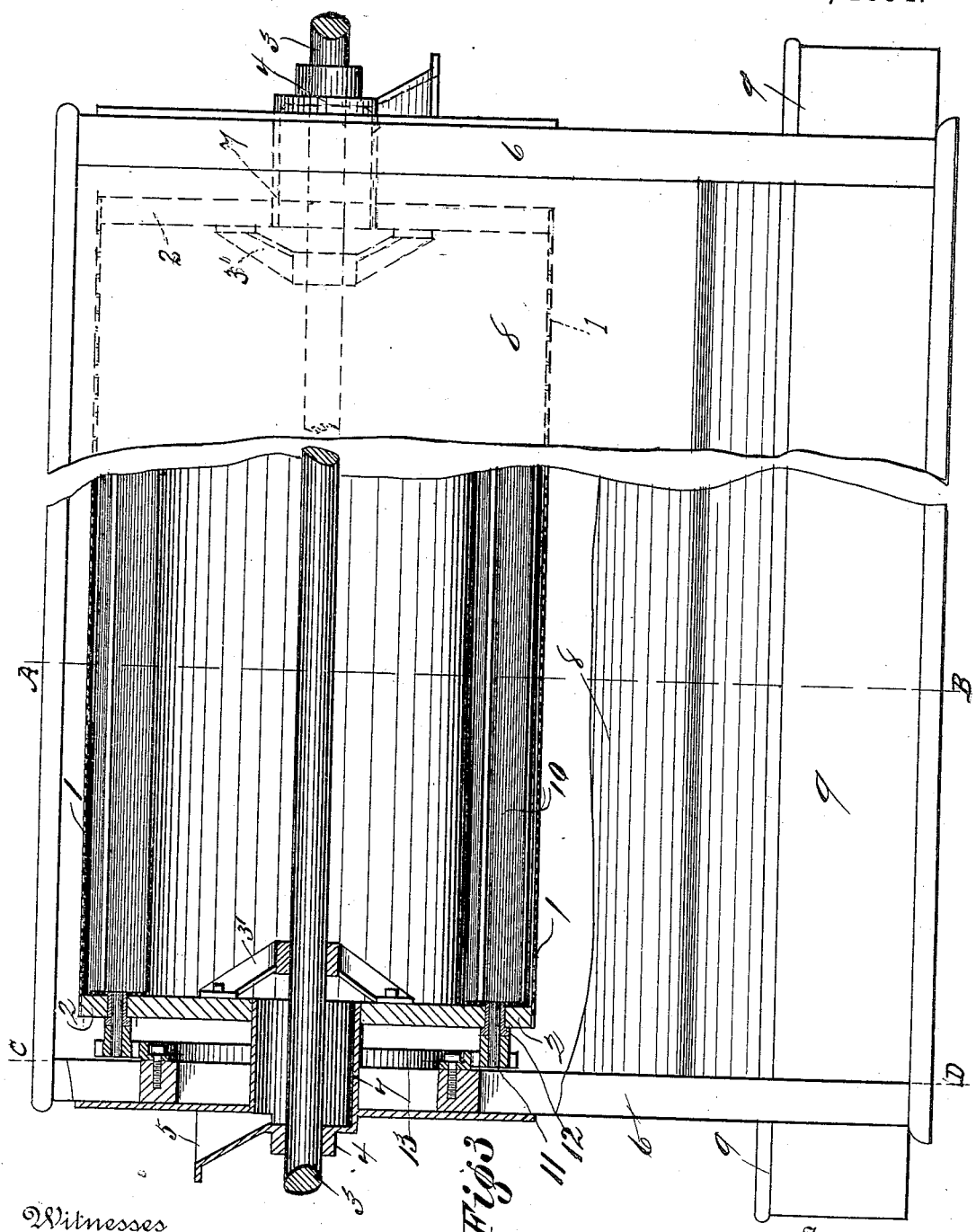

(No Model.) 2 Sheets—Sheet 1.
J. R. STAUDT.
FLOUR BOLT.
No. 511,815. Patented Jan. 2, 1894.
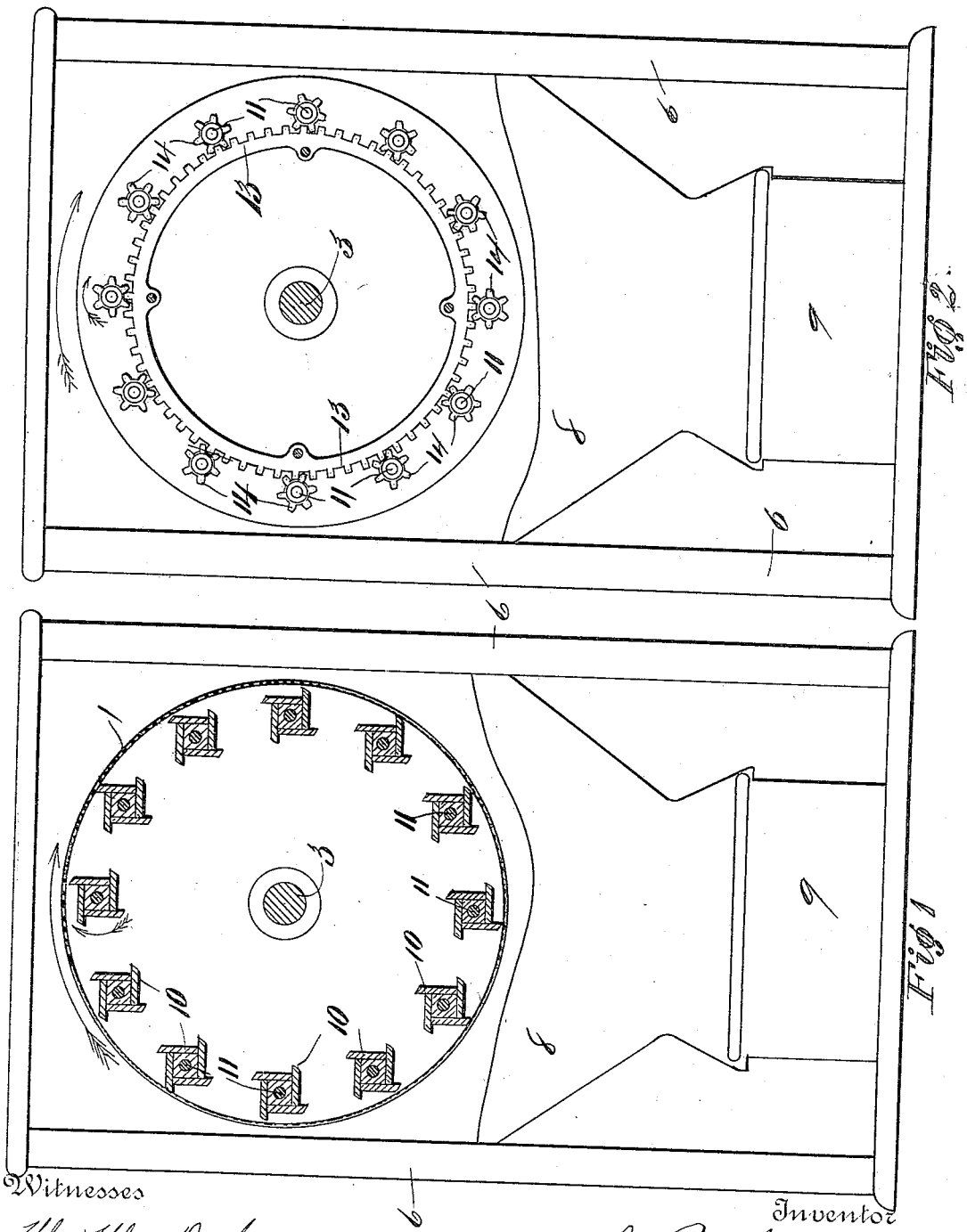
Witnesses
U. U. Defrex
Jno. G. Thurtle
Inventor
John R. Staudt
By his Attorney
Thompson & Bell (No Model.) 2 Sheets—Sheet 2.

J. R. STAUDT.
FLOUR BOLT.

No. 511,815. Patented Jan. 2, 1894.

Witnesses
Inventor
John R. Staudt
By his Attorney
Thompson & Bell

UNITED STATES PATENT OFFICE.

JOHN R. STAUDT, OF INDIANAPOLIS, INDIANA.

FLOUR-BOLT.

SPECIFICATION forming part of Letters Patent No. 511,815, dated January 2, 1894.

Application filed November 30, 1892. Serial No. 453,657. (No model.)

*To all whom it may concern:*

Be it known that I, JOHN R. STAUDT, a citizen of the United States, residing at Indianapolis, in the county of Marion and State of Indiana, have invented new and useful Improvements in Flour-Bolts, of which the following is a specification.

My invention relates to improvements in flour bolting machines and consists in a peculiar construction of revolving reel having a series of revolving beaters or agitators arranged at regular intervals around the periphery and the interior of the reel.

The object of my invention is to more effectually and rapidly bolt the flour, and, to provide means whereby the beaters will rotate at a peripheral velocity equal to, greater, or less than the peripheral velocity of the main reel. I attain these objects by means of the mechanism illustrated in the accompanying drawings in which similar numbers of reference designate like parts throughout the several views.

Figure 1. is a transverse sectional elevation of the machine through the line A. B. (see Fig. 3.) showing the reel and its internal revolving reel beaters. Fig. 2. is a transverse sectional elevation of the machine through the line C. D. (see Fig. 3.) showing the means whereby the beaters are rotated, and Fig. 3. is a longitudinal side elevation partly in section and showing the manner of journaling and arranging the revolving beaters in the interior of the cylinder or reel.

The reel of the machine may either be cylindrical or polygonal in form and is composed of the usual bolting cloth 1. extending over and around the cylindrical surface thereof and secured and stretched on the peripheral edges or rims of the ends of the reel or heads 2. which latter may be either firmly, or adjustably and removably secured on the shaft 3. by any suitable securing bracket 3'. The heads 2 encircle and bear upon the ends of the ducts 7, hereinafter described, and the brackets 3' are provided with inclined arms secured to the said heads and with hubs secured to the shaft 3, leaving spaces for the material to pass from the inlet duct to the interior of the reel. The shaft 3. is journaled in a suitable bearing 4. formed on the hopper 5. which is secured on the end frame work 6 of the machine, the center ducts 7. of which are concentric with the axis of the reel and are provided for the purpose of supplying the material to be bolted to the interior of the reel in the usual manner or in the manner usual in this class of machine.

8. designates the casing of the machine suitably secured on the framing thereof, and wherein the reel is inclosed and is provided at its base with the usual box 9. adapted to inclose a conveyer of approved construction for removing the bolted flour from the machine. The beaters 10. secured on their driving shafts 11. are arranged around the periphery of the interior of the reel and may be spaced at regular intervals, or unequal intervals with their axes of rotation either parallel, or slightly inclined, or concentric and inclined, with the axis of rotation of the reel. The shafts 11. whereon the beaters are secured are mounted in suitable bearings 12. which may be formed integral with the heads 2. of the reel or they may be removably and adjustably secured therein.

The fixed wheel 13. is secured firmly to the frame 6. or any fixed piece attached thereto and is central with the axis of the reel and has its teeth adapted to mesh with the pinions 14. secured on the shafts 11. The pinions 14. being journaled in the ends of the reel and fixed relatively with the latter, rotate with it, and engage the fixed or driving wheel 13. at all points of its circumference throughout their respective paths round the axis of the reel as the latter is rotated, and revolve at a speed or velocity of rotation equal to, greater, or less than the peripheral speed of the reel and in the same direction.

The operation of the reel is as follows:— The reel mounted on its shaft 3. is first rotated at a suitable velocity by any suitable driving mechanism and the flour or other material to be bolted is fed through the hopper to and through the spout thereof into the interior of the reel, during rotation, wherein it is agitated by the revolving beaters 10 and scattered over the interior surface of the bolting cloth of the reel through the meshes of which the finer particles of flour escape or pass and fall into the box 9 whence it is conveyed to a suitable receptacle, the residue or coarser particles remaining in the interior of the reel being discharged in any suitable manner or well known means adapted in this class of machine, as by suitable discharge spouts, &c.

Having thus fully described the nature and operation of my invention, what I claim as new and useful, and desire to cover by Letters Patent of the United States therefor, is—

In a flour bolt, the combination, with the main driving shaft, driving devices for revolving it, the ducts 7 concentric with the said shaft the heads 2 journaled on the ends of the said ducts, the brackets provided with inclined arms and securing the said heads to the said shaft, and the bolting cloth secured to the said heads; of a series of beaters mounted on shafts journaled in the said heads 2 contiguous to the said bolting cloth and revolving with it about the driving shaft, the toothed pinions secured on the said beater shafts, and a stationary toothed wheel gearing into the said pinions and revolving the beaters about their own axes, substantially as set forth.

In testimony whereof I have hereunto set my hand in the presence of two subscribing witnesses.

JOHN R. STAUDT.

Witnesses:
THOMPSON R. BELL,
J. B. ALLFREE.